INVENTOR.
PETER F. CROSBY
BY
D. Emmett Thompson
ATTORNEY.

Dec. 31, 1968 P. F. CROSBY 3,419,229
PNEUMATIC TUBE SYSTEM
Filed Nov. 14, 1966

INVENTOR.
PETER F. CROSBY.
BY
D. Emmett Thompson
ATTORNEY.

Dec. 31, 1968    P. F. CROSBY    3,419,229
PNEUMATIC TUBE SYSTEM
Filed Nov. 14, 1966    Sheet 3 of 3

INVENTOR.
PETER F. CROSBY.
BY
*D. Emmett Thompson*
ATTORNEY.

United States Patent Office 3,419,229
Patented Dec. 31, 1968

3,419,229
PNEUMATIC TUBE SYSTEM
Peter F. Crosby, Cazenovia, N.Y., assignor to Diebold Incorporated, Canton, Ohio, a corporation of Ohio
Filed Nov. 14, 1966, Ser. No. 594,175
10 Claims. (Cl. 243—19)

ABSTRACT OF THE DISCLOSURE

A plurality of sending and receiving stations are spaced along a tube line, the line extending through a casing at each station. The tube line has an opening for the lateral insertion and discharge of carriers into and from the tube line in each casing. Air pressure is applied to opposite ends of the tube line and each casing has remotely operated means for venting the casing to atmosphere.

---

This invention relates to pneumatic tube systems which, in general, consists of a tube line extending to a plurality of ending and receiving stations, and carriers propelled through the tube line by air flow therein.

More particularly, the invention has to do with a pneumatic tube system employing a single tube line with a plurality of sending and receiving stations spaced along the tube line. At present, in the single tube line, an air flow is created at one end of the tube line either by pressure, or vacuum. There is a mechanical carrier ejector at each station movable into the tube line for directing the carrier out of the tube. The mechanical ejector being operated by pre-established electrical circuitry.

In such an arrangement, and also in other pneumatic tube systems, the carrier moving at high speed through the tube line has considerable momentum and when ejected, or discharged, from the tube line, there is high impact between the carrier and the closed door at the receiving station, or between the carrier and the wall of the casing at the receiving station, with the result that the life expectancy of the carriers is relatively short. This is the more true when the carriers are of substantial size and carry a relatively heavy load.

This invention has as an object a pneumatic tube system embodying a single tube line extending through or to all sending and receiving stations. Air flow is created in the tube line and moves in opposite directions, relative to any selected receiving or discharge station. Accordingly, as a carrier moving through the tube line arrives at a discharge station, it is confronted with air flow moving in the opposite direction, and which is accordingly effective to rapidly reduce the forward movement of the carrier. This opposite air flow provides a yielding or resilient braking effect which quickly brings the carrier to a stop and simultaneously directs the stopped carrier outwardly through an opening in the side wall of the tube line, thus avoiding any impact to the carrier. This results in making it possible to form the carriers of light weight construction and to move the carriers at higher velocity through the tube line.

The invention has as a further object, a pneumatic tube system of the type referred to embodying a transfer fitting having no moving parts. The fitting serving to connect tube lines extending in parallel spaced relation and being disposed normal to the axis of the tube lines, thereby eliminating the use of space consuming reverse tube bends.

Another object of the invention is the pneumatic tube system referred to embodying vertically disposed riser and drop station fittings, whereby the sending and receiving station may be mounted above the tube line—for example, the tube line may extend under the floor, or along the floor, and the station may be located on a cabinet top in the room area above the floor.

The invention has as a further object a tube system as above set forth, and including interchange switch fittings for connecting branch tube lines to a main tube line, the interchange switch fitting having no movable deflectors, or blades, but being operable solely by the air flow in the tube system.

The pneumatic tube system of my invention is operated entirely on the basis of air logic, rather than mechanical switch means, carrier ejectors, etc. In general, the system of the invention includes a tube line with sending and receiving stations spaced along the line. At each station, the side of the tube line is cut away on a diametric plane, the cut away portion being slightly greater in length than the length of the carriers used in the system. Preferably, the portion of the tube line at each station formed with the opening is enclosed in a casing. Means is connected with the tube line for establishing air flow therethrough in opposite directions at the opening at a selected station. The opposing air flow may be established by connecting a blower to each end of the tube line or, by connecting the suction side of a blower to the tube opening, or to the casing, in which event both ends of the tube line are open to atmosphere. Accordingly, air moves inwardly from both ends of the tube line and outwardly through the opening connected to vacuum.

In either event, when a carrier moves in the tube line and arrives at the selected station, it encounters air flow in the opposite direction in which the carrier is moving, causing the carrier to be yieldingly, but quickly, stopped in registration with the opening whereupon the carrier may drop out of the opening.

When a carrier is inserted in the tube line at the sending station, that opening in the tube line, or the casing at that station, is closed air tight, as are all the other openings and all casings on the line, with the exception of the selected receiving station. Accordingly, the carrier is quickly moved to the selected receiving station and ejected from the tube line.

As previously stated, the tube system may also include arrangements for the transferring, or switching, of carriers from one tube line to another, and for moving the carriers vertically from a tube line to a station.

The invention consists in the novel features and in the combinations and constructions hereinafter set forth and claimed.

In describing this invention, reference is had to the accompanying drawings in which like characters designate corresponding parts in all the views.

In the drawings:

FIGURE 1 illustrates schematically the layout of a system embodying my invention. The layout, shown in FIGURE 1, illustrates a number of different arrangements which may be adopted in my system.

Figure 1:
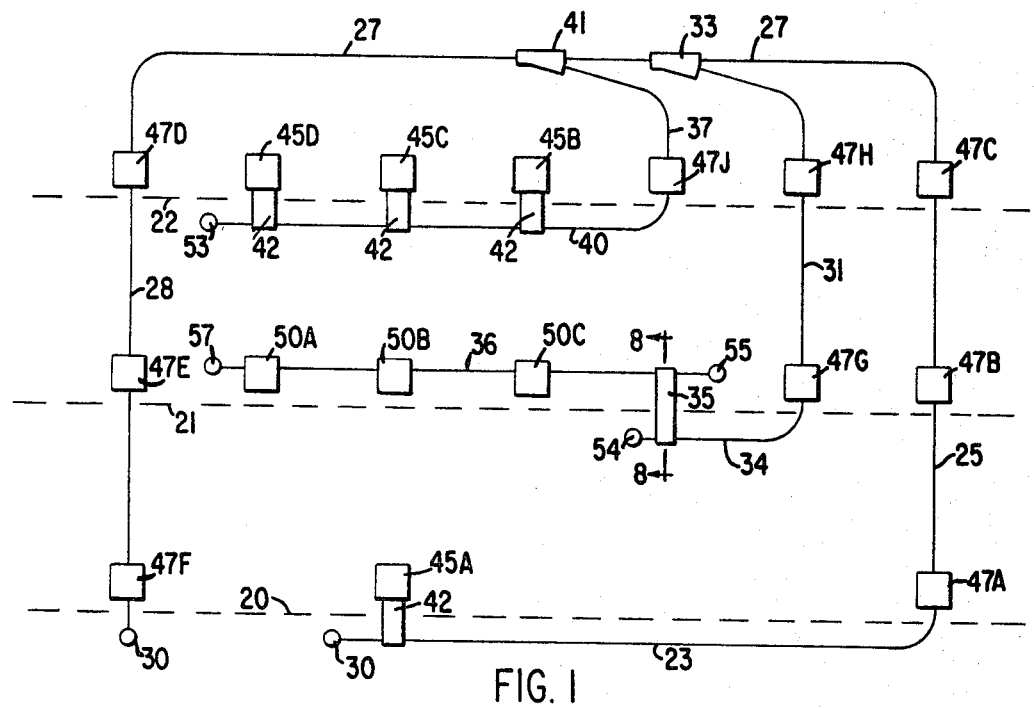
FIGURE 1 is a schematic diagram of a system embodying my invention.

The horizontal lines 20, 21, 22, designate the first, second and third floor lines in a building. One single tube line has a section 23 disposed horizontally below the floor 20 and joining with a vertically disposed section 25 which, at its upper end, connects with a horizontally extending section 27 terminating in a vertically disposed section 28. A blower 30 is connected to each end of the tube line and functions to establish a pressure therein.

There is a branch circuit tube line, including a vertically disposed section 31, connected at its upper end to the upper horizontal run 27 by a switch fitting 33. The lower horizontal run 34 of this branch line is connected to a horizontal tube line 36 by a transfer fitting 35.

A second branch circuit has a vertically disposed run 37 connected at its lower end to a horizontal run 40 extending below the third floor line 22. The upper end of the second branch circuit is also connected to the upper run 27 of the first tube line by a switch fitting 41.

The horizontal run 23 and the horizontal section 40 of the second branch circuit extend through riser and drop station fittings 42. The riser and drop station fittings 42 communicate at their upper ends with station casings 45A, 45B, 45C and 45D. The vertical section 25, as well as the vertical sections 31, 37, in the branch circuit tube lines extend through casings 47A, 47B, 47C, 47D, 47E, 47F, 47G, 47H and 47J. The horizontal line 36 extends through casings 50A, 50B, 50C. A blower 53 is connected to the free end of the run 40 of the third branch circuit tube line. A blower 54 is connected to the lower end of the first branch circuit run beyond the transfer fitting 35. A blower 55 is connected to the horizontal run 36 at the opposite side of the fitting 35, and a blower 57 is connected to the opposite end of the run 36.

It will be observed that in the arrangement shown in FIGURE 1, each tube line is provided with blowers to create air flow through each tube line run of the system in opposite directions. At each sending and receiving station, the tube line is cut away on one side to provide for the insertion of a carrier in the tube line, and for the discharge of a carrier therefrom. When a carrier is moving in the tube line, the opening in the tube line at the station to which the carrier is directed, is open to atmosphere. Accordingly, the air flow created by the blowers, at the opposite ends of the tube line, moves through the tube line in opposite directions toward the station in which the opening in the tube line is communicating with atmosphere. Therefore, as a carrier reaches that station, it encounters an air flow in the opposite direction, which quickly and effectively brings the carrier to a stop, whereupon it may drop through the opening in the side wall of the tube. The air flow opposite to the movement of the carrier also assists in discharging the carrier from the tube line.

Figure 4:
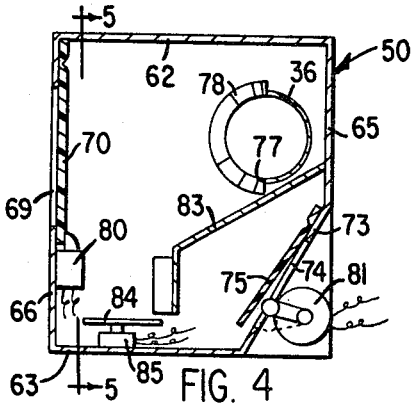
FIGURE 4 is an end view of a casing at a sending and receiving station, with the end wall of the casing removed and the tube line disposed horizontally.
Figure 5:
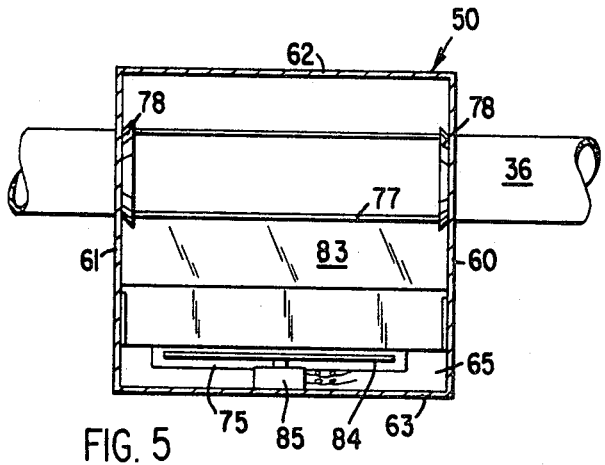
FIGURE 5 is a view taken on line 5—5, FIGURE 4.

FIGURES 4 and 5 illustrate the arrangement in a casing through which a horizontally disposed tube line passes, as the tube line 36. The casing 45 consists of a rectangular shaped boxlike enclosure having end walls 60, 61, a top wall 62, and a bottom wall 63. The rear wall 65 and the front wall 66 of the casing are formed with apertures, or openings, and closures are provided therefor. The opening 69 in the front wall 66 of the casing is of substantial dimension and is normally closed by a flap type access door 70. The lower portion of the rear wall 65 slants inwardly, as at 73 and is formed with an opening 74 which normally is closed by a flap type vent closure 75, see FIGURE 4. The tube, as 36, within the casing, is cut away at its forward side—that is, half of the tube is removed, the removed half having a length slightly greater than the length of the carrier C. This diametric cut through the tube is not in the vertical plane but is located so that the lower edge 77 of the opening is slightly forward of the vertical plane. This to assist in the passage of the carriers through stations other than the one to which the carrier is destined. The tube at the end edges of the opening therein are flared outwardly, as at 78.

As previously stated, the door 70 is normally closed and is maintained in closed position by a solenoid operated latch 80, see FIGURE 4. At the receiving station to which the carrier is directed, the vent door or closure 75 is moved to open position by a rotary solenoid 81. Accordingly with this condition, air moving in the tube 36 to the right, FIGURE 5, passes outwardly through the opening of the tube into the casing, and outwardly through the opening 74 in the rear wall thereof. Also, the air flow moving to the left in the tube line is moving through the same exit. Accordingly, if the carrier is moving in the tube line to the right, as it arrives at the opening in the side wall of the tube, it is encountered by air flow moving to the left which is effective to quickly, but yieldingly, bring the carrier to a standstill, whereupon it may drop out of the tube, as previously stated.

Station casings 50 are provided with a wall, or shelf, 83 inclining downwardly from the opening in the tube toward the front wall 66 but terminating in spaced relation thereto. Intermediate the front wall 66 and the lower end of the shelf 83 there is a pad 84 upon which the discharged carrier drops, actuating switch 85, which, as will be hereinafter explained in greater detail, operates a signaling system to indicate that the carrier has arrived at its destination.

Figure 6:
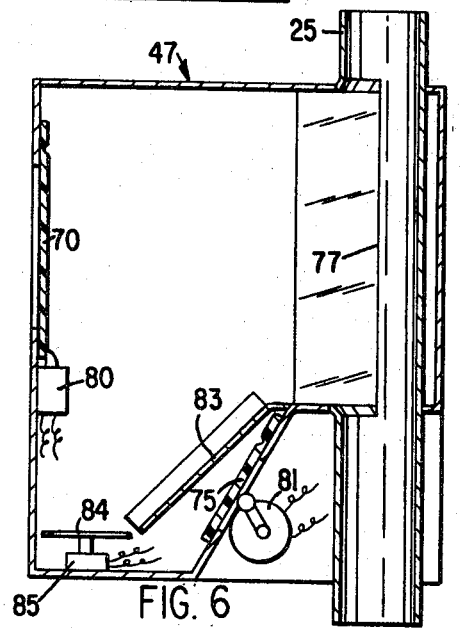
FIGURE 6 is a view, similar to FIGURE 4, with the tube line disposed vertically.

FIGURE 6 illustrates the arrangement with the tube line extending vertically through a station casing. The basic arrangement of the casing is the same as that shown in FIGURE 4, including the front door 70 and latch 80, the vent closure 75 and actuator 81, and the shelf 83 for directing the discharged carrier onto the pad 84 for actuing the signal switch 85.

Figure 8:
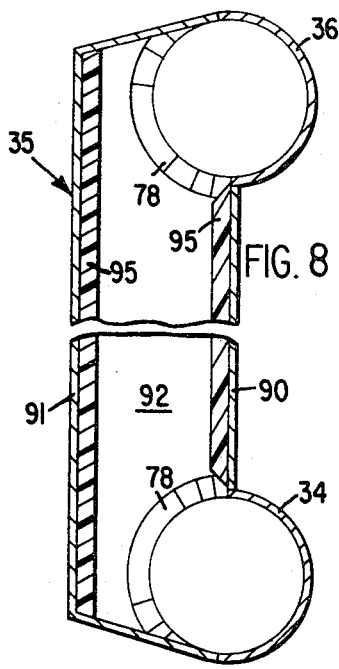
FIGURE 8 is a vertical sectional view of a riser and drop interchange between two horizontally disposed tube lines, with one line extending in parallel spaced relation above the other, the view taken as indicated by line 8—8, FIGURE 1.

The transfer fitting 35, shown in FIGURE 8, is employed to connect two tube lines extending in spaced parallel relation as, for example, the horizontal tube lines 34, 36, in the system shown in FIGURE 1. This fitting consists of a hallow body section, rectangular in cross section, having side walls 90, 91, and end walls 92. The body is dimensioned to provide a passage for the reception of a carrier C disposed lengthwise of the tube lines. One end of the body communicates with the opening in the side wall of one of the tube lines, as line 34. The opposite end of the body passage communicates with the opening formed in the second tube line, as line 36.

Referring to FIGURE 1, if a carrier is moving to the left in the horizontal run 34, when it arrives at the opening in that tube line at the bottom of the fitting 35, it will encounter air flow from the blower 54, and discharge of the carrier into the fitting 35 will be effected in the same manner as in regard to the casings 47 and 50. Also, the carrier will be moved upwardly through the passageway into the upper tube line 36 and, by air flow from the blower 55, the carrier will move to the left through the tube run 36 to the selected receiving stations 50A–50C. It will be apparent, the reverse movement of the carrier through fitting 35 takes place in the same manner. The transfer fitting may be disposed at any angle from horizontal position to vertical position for transferring from one tube line to another.

Figure 7:
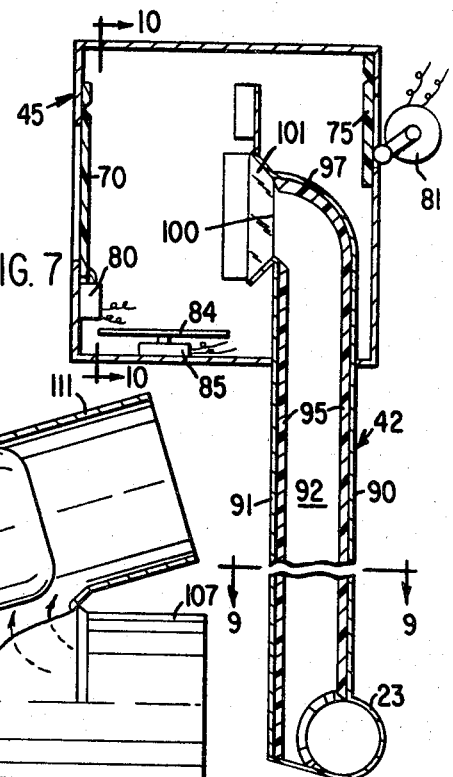
FIGURE 7 is a view, similar to FIGURES 4 and 6, showing a riser terminal arrangement.
Figure 10:
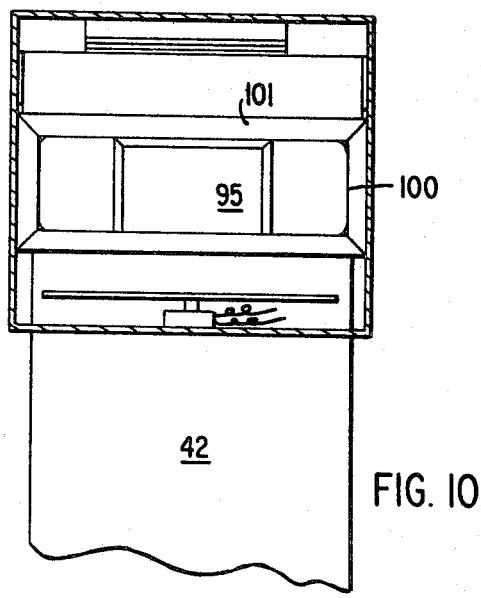
FIGURE 10 is a view taken on line 10—10 FIGURE 7.
Figure 9:
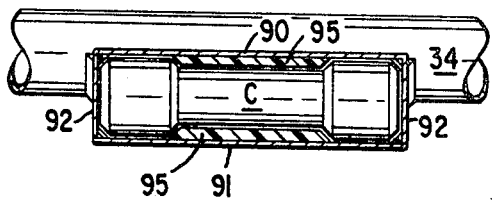
FIGURE 9 is a view taken on line 9—9, FIGURE 7.

The riser and drop fittings 42, terminating in the station casings 45, are illustrated in FIGURES 7, 9 and 10. Basically, the fittings 42 are similar to the transfer fittings 35, with the exception that the upper ends of the fittings 42 terminate in the casings 45, rather than in another tube line.

Referring to FIGURES 8 and 9, the body of the fitting is also formed with the side walls 90, 91, and end walls 92 and, as also is the case in the transfer fittings 35, vertically disposed guide strips 95 are fixed to the inner surfaces of the walls 90, 91. The carriers are formed with enlarged end portions having a diameter comparable to the inner diameter of the tube lines, as is conventional. The guide strips 95 are positioned in registration with the intermediate portion of the carrier which is of reduced diameter, see FIGURE 9. These guide strips serve to prevent tumbling of the carriers during their upward and downward movement through the transfer and riser and drop interchange fittings.

The lower end of the fitting 42 has communication with the opening in the tube line, see FIGURE 7, and the upper end is curved forwardly, as at 97, FIGURE 4, to direct the carrier into the casing 45. The upper end of the fitting is formed with an opening 100 through which the carrier is discharged, and the opening is bordered by an inclined flange 101. The casing 45 is provided with the door 70, solenoid latch 80, pad 84, switch 85, vent closure 75, and actuator 81.

By means of this fitting, carriers can be propelled upwardly from a tube line and discharged into the casing 45 at a selected station. Also, carriers can be inserted in the upper end of the fitting for dispatch. This arrangement is particularly advantageous in that it permits the tube line to be run beneath the floor of a building, with the casings 45 at the sending and receiving stations being located within the area above the floor.

Figure 3:
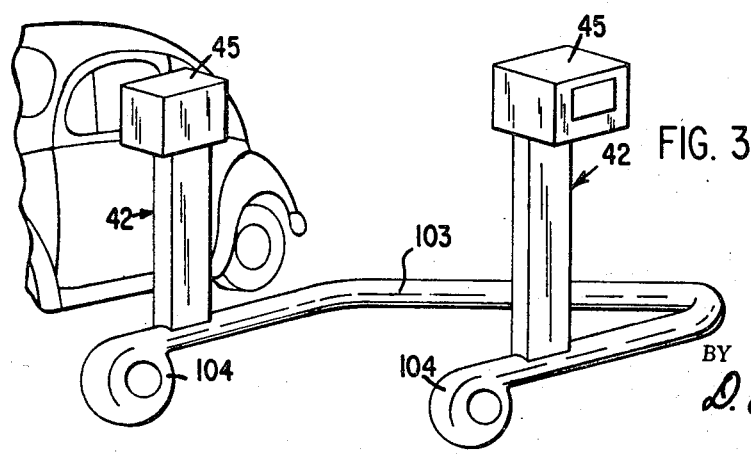
FIGURE 3 shows the invention used in a bank teller arrangement.

This arrangement is also particularly well suited for installations, such as drive-in bank teller arrangements. As illustrated in FIGURE 3, a sending and receiving casing 45 may be mounted at the upper end of a fitting 42 for use by a drive-in bank customer. Another casing 45 is located within the bank. The lower ends of the fittings 42 are connected to a tube line 103, the ends of which are connected to blowers 104, the tube line being located below the street curb line and extending through the basement wall into the bank building.

Figure 11:
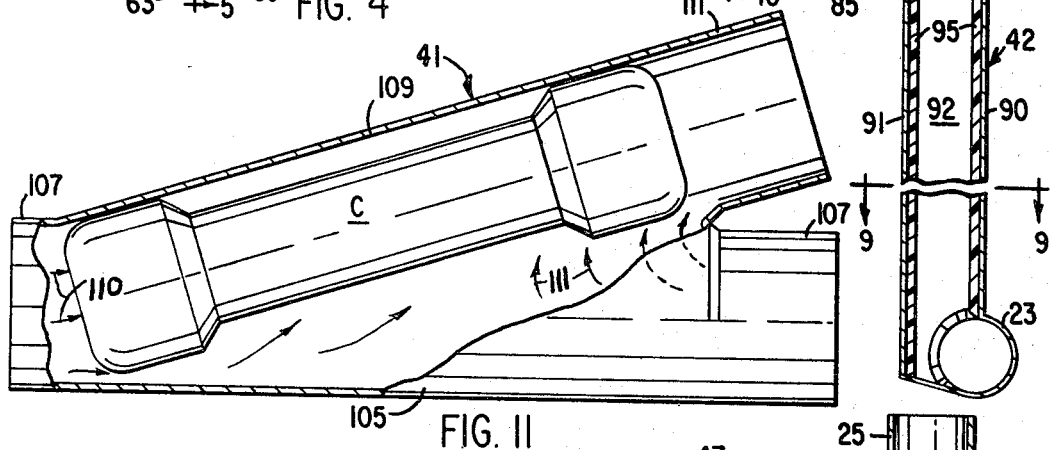
FIGURE 11 is a side elevational view, partly in section, of a three line interchange tube line fitting.

Because of the unique functional operation of my system, interchange or switching fittings, as 33, 41, may be used for connecting branch tube lines, as 31, 37, to a main line, as 27. The fittings is shown in FIGURE 11. It is essentially a Y fitting formed with a tubular portion 105 having an axial carrier passage with end hubs 107 connected in the main tube line. The fitting also has a portion 109 forming a branch carrier passage communicating with the axial passage and extending therefrom in angular relation thereto, the portion 109 being provided with a hub end 111 for connection to one end of the branch tube line. The fitting is of simple tubular construction and contains no moving elements, such as deflectors, or switching blades, the transfer of carriers to or from the main tube line being effected entirely by air logic, that is, by the direction of the flow of air in the fitting.

For example, if a carrier from tube line 28, FIGURE 1, is moving to the right in line 27 by means of air flow from the blower 30 at the end of the line 28, as indicated in FIGURE 11 by arrows 110, and the carrier encounters air flow moving to the left in line 27, as indicated by arrows 111, when the carrier arrives in the fitting 41, it will be apparent that the carrier will be directed downwardly through the branch run 37 to station 47J, or a selected one of the stations 45B–45C, depending on which station in lines 37, 40, is vented. Even if the switching fitting is disposed as shown in FIGURE 11, the carrier C will be directed upwardly into the branch line.

After the carrier enters the line 37, it will be discharged at station 47J if it is the selected vented station or, if not, it will continue on through line 40, to the vented station 45B–45D. In the latter case, the carrier moving to the left in line 40 and with casing 45C vented, the carrier will encounter air flow moving to the right at the bottom of the riser 42, and will be moved upwardly therethrough and discharged in the casing 45C.

It will be apparent from the description above set forth, that a carrier inserted in a tube line at any station can be transmitted to any other station in the system by energizing the blowers 30, 53, 55 and 57, and energizing the solenoid 81 at the selected discharge station to move the vent door 75 thereof to open position. With the blowers at the ends of the tube lines in operation, air flow in opposite directions will be established at the vented station and/or at the transfer fitting 35 and riser fittings 42 if they are disposed in the path being traveled by the carrier. As a further example, assume a carrier is dispatched from station 45A for discharge to the station 47G. Air flow will be created in line 31 towards station 47G by blower 30 at the end of line 23, the flow being through line 25, through fitting 33, line 31, to station 47G. Air flow will also move from blower 30 through line 28, line 27, fitting 33, to the vented casing 47G. Air flow in the opposite direction at casing 47G will be established by the blowers 54, 55, 57.

When the carrier is inserted in the riser 42, extending downwardly from casing 45A, the carrier will drop into the line 23 and will be moved forwardly by the blower 30, upwardly through line 25, through line 27. Upon reaching the switching fitting 33, the carrier will encounter air flow moving to the right in line 27, and will be directed downwardly into line 31. When the carrier reaches station 47G, it will be discharged upon encountering air flow in opposite directions from the blowers 54, 55, 57.

Figure 2:
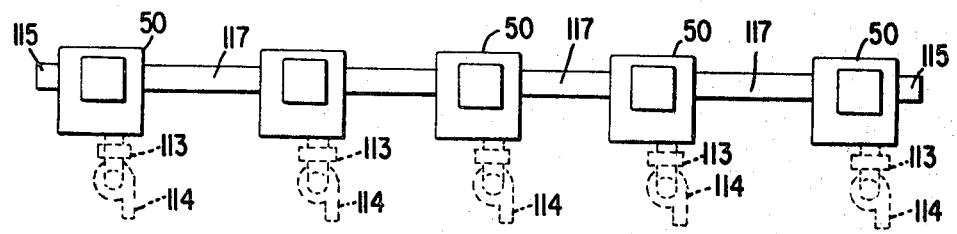
FIGURE 2 is a schematic diagram of a system embodying a modified form of apparatus.

While the system thus far described is operated by blowers creating air pressure at the ends of the tube lines, air flow in opposite directions may be established at a selected station by connecting the opening in the tube line thereat, or the casing, to the suction or intake side of a pump 114, see FIGURE 2.

With this vacuum arrangement, the ends of the tube lines, as the ends 115 of the tube line 117, are open to atmosphere. Accordingly, when the pump 114 at a selected discharge station is put in operation at that station, air flow is established at the station in opposite directions to effect discharge of the carrier.

It will be understood that with my system installed, there will be a console at each station provided with a number of switches comparable to the number of stations in the system. Closing one of these switches will energize the pressure, or vacuum blowers, for a selected station and for energization of the solenoid 81 at that station to open the vent door 75. Upon the arrival of the carrier and its discharge from the tube line at that station, switch 85 will be actuated by the discharged carrier to energize a solenoid latch 80, if one is used, to permit the access door 70 to be open for the removal of the carrier. Also, to de-energize the blowers.

It will also be apparent that each casing may be provided with red and green signal lights, the green light being displayed at the selected discharge station, and the red lights being displayed at all other stations to indicate that a carrier is in transit.

It is obvious that my system embodies an arrangement particularly economical to produce and also to install, and further provides fittings of simple construction and functioning by air logic for the direction of carriers from one tube line to another, and to stations which may be located above the tube lines.

What I claim is:

1. A pneumatic tube system for the transmission of carriers including a main tube line, a branch tube line, said main tube line extending through a plurality of sending and receiving stations, said branch tube line extending from said main tube line through at least one sending and receiving station, a carrier switching fitting having an axial carrier passage connected at its ends in said main tube line and forming a continuation thereof, said fitting also having a branch carrier passage communicating with said axial passage and extending therefrom in angular relation thereto, and being connected to one end of said branch tube line, each of said tube lines being formed with an opening in the side wall thereof at each sending and receiving station for the insertion and discharge of carriers, means at each station for connecting and disconnecting said openings to atmosphere, and means connected to the ends of said lines for creating air flow in said lines from the ends thereof toward said switching fitting.

2. A pneumatic tube system for the transmission of carriers including a first tube line, a second tube line extending in parallel spaced relation to said first tube line, a transfer fitting connecting said tube lines intermediate the ends thereof, said fitting comprising a hollow body rectangular in cross section and dimensioned to provide a passage for a carrier disposed in parallel relation to said tube lines, said tube lines extending through a plurality of sending and receiving stations, said tube lines having an opening in the side wall thereof at each station for the insertion and discharge of carriers, said first and second tube lines also being formed with openings communicating with the ends of said passage for the movement of carriers from one line through the passage to the other tube line, means at each of said stations operable for connecting and disconnecting the openings in the tube lines to atmosphere, and means connected to the ends of said tube lines for creating an air flow therethrough simultaneously in opposite directions to a tube opening connected to atmosphere at a selected station.

3. A pneumatic tube system as defined in claim 2, wherein means is provided on the inner surface of said passage and cooperable with a carrier to prevent movement of the carrier out of parallel relation to said tube lines during movement of the carrier in said passage.

4. A pneumatic tube system for the transmission of carriers, said system including a tube line extending through a plurality of sending and receiving stations, said tube line having a horizontally disposed section in the area of one of said stations and being formed with an opening in the side wall of the tube line dimensioned to permit a carrier to pass into and out of said tube line, a hollow body connected to said tube line about said opening and extending upwardly therefrom, said body being rectangular in cross section and dimensioned to provide a vertical passage for a carrier disposed in parallel relation to said tube line, said passage communicating at its lower end with the opening in the side wall of said tube line and terminating at its upper end at an opening in said body for the insertion and discharge of carriers, means operable to connect and disconnect the opening at the upper end of said passage to atmosphere, and means connected to said tube line and operable for creating an air flow therethrough in opposite directions at the opening in said tube line.

5. A pneumatic tube system for the transmission of carriers, said system comprising a tube line, a plurality of sending and receiving stations spaced along said tube line, a normally closed casing at each of said stations, said tube line extending through each of said casings and having a portion within each casing formed with an opening in the side wall for the insertion and discharge of carriers, each of said casings being formed with a vent aperture, a closure member mounted at each casing and being movable into open and closed position relative to said vent aperture, said member being normally in closed position, operating means connected to said member and operable when actuated to move said closure member to open position for connecting the interior of the casing to atmosphere, air pressure means connected to each end of the tube for simultaneously creating air flow under pressure in opposite directions through the tube line to the opening therein for exit therefrom in a vented casing to effect discharge of a carrier traveling in the tube line through said opening into said vented casing.

6. A pneumatic tube system for the transmission of carriers, said system comprising a tube line, a plurality of sending and receiving stations spaced along said tube line, a normally closed casing at each of said stations, said tube line extending through said casings, the portions of said tube line within each casing being formed with an opening in the side wall for the insertion and discharge of carriers, each of said casings having an access opening for the removal of carriers from the casing and the insertion of carriers in the opening in the tube line, a door for said opening movable to open and closed positions, said door being urged to closed position by super atmospheric pressure within the casing, a door latch member for latching said door in closed position and being movable to unlatching position, means associated with each casing and operable, when actuated, to connect the interior of the casing to atmosphere, latch actuating means associated with each casing and operable, upon discharge of a carrier from said tube line into said casing, to effect movement of said latch member to unlatching position, and air pressure means connected to each end of the tube line for simultaneously creating air flow in opposite directions through a tube opening in a casing connected to atmosphere.

7. A pneumatic tube system for the transmission of carriers, said system including a tube line extending through a plurality of sending and receiving stations, said tube line being formed with an opening in the side wall thereof at each of said stations and dimensioned to permit a carrier to pass into and out of said tube line, a riser and drop fitting connected to said tube line about the opening therein at one of said stations and extending upwardly therefrom, said fitting being dimensioned to provide a vertical passage for a carrier disposed in parallel relation to said tube line, said fitting being formed at its upper end with an opening for the insertion and discharge of carriers, and air flow creating means connected to said tube line and operable to create an air flow therethrough simultaneously in opposite directions at the opening in the tube line at a selected station.

8. A pneumatic tube system for the transmission of carriers, said system including a tube line extending through a plurality of sending and receiving stations, said tube line being formed with an opening in the side wall thereof at each of said stations and dimensioned to permit a carrier to pass into and out of said tube line, a vertically disposed riser and drop fitting connected at the lower end thereof to said tube line about the opening therein at each of said stations, said fitting being dimensioned to provide a vertical passage for a carrier disposed in parallel relation to said tube line, said fittings communicating at their upper ends with casings for receiving carriers discharged from said tube line, and air flow creating means connected to said tube line and operable to create an air flow therethrough simultaneously in opposite directions at the opening in the tube line at a selected station.

9. A pneumatic tube system as defined in claim 5, wherein said venting closure member is urged to closed position by super atmospheric pressure within the casing, and said operating means for said closure member includes an electro-responsive device, and means is provided at each of the other casings to energize said electro-responsive device.

10. A pneumatic tube system as set forth in claim 5, wherein each of said casings are formed with an access opening for the removal of carriers from the casing and the insertion of carriers in the opening in the tube line, a door closure for said opening, said door closure being urged to closed position by super atmospheric pressure within the casing.

References Cited
FOREIGN PATENTS 1,131,152  6/1962  Germany.

EVON C. BLUNK, *Primary Examiner.*

H. C. HORNSBY, *Assistant Examiner.*

U.S. Cl. X.R.

243—24, 38, 23, 1